June 7, 1966        S. BAER ETAL        3,255,220

PRE-TREATMENT OF OLEAGINOUS PLANT MATERIALS

Filed Nov. 6, 1962        4 Sheets-Sheet 1

INVENTORS.
SHELDON BAER
MAURICE A. WILLIAMS
BY    CARL W. ZIES

Meyer, Baldwin, Doran & Egan
ATTORNEYS

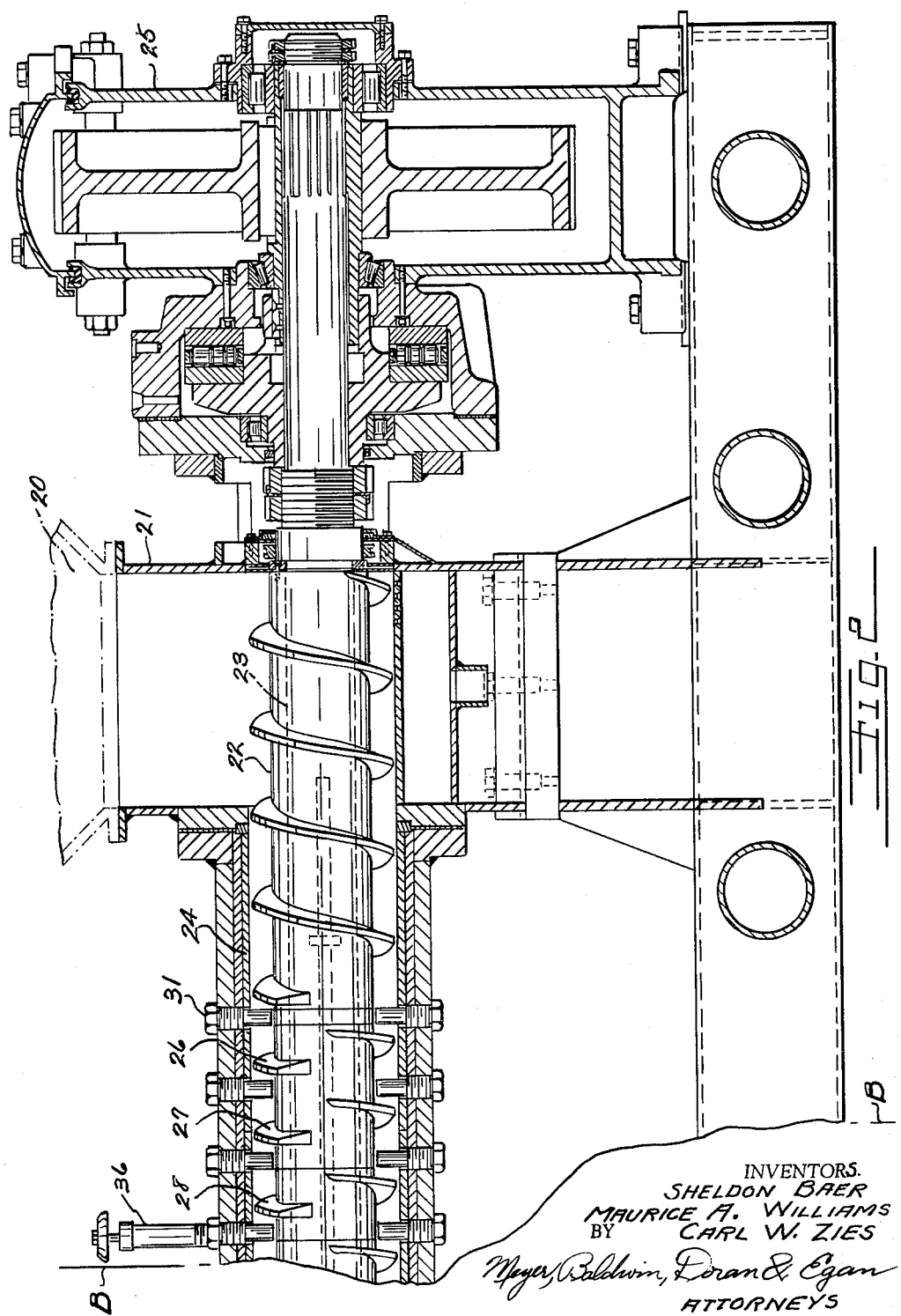

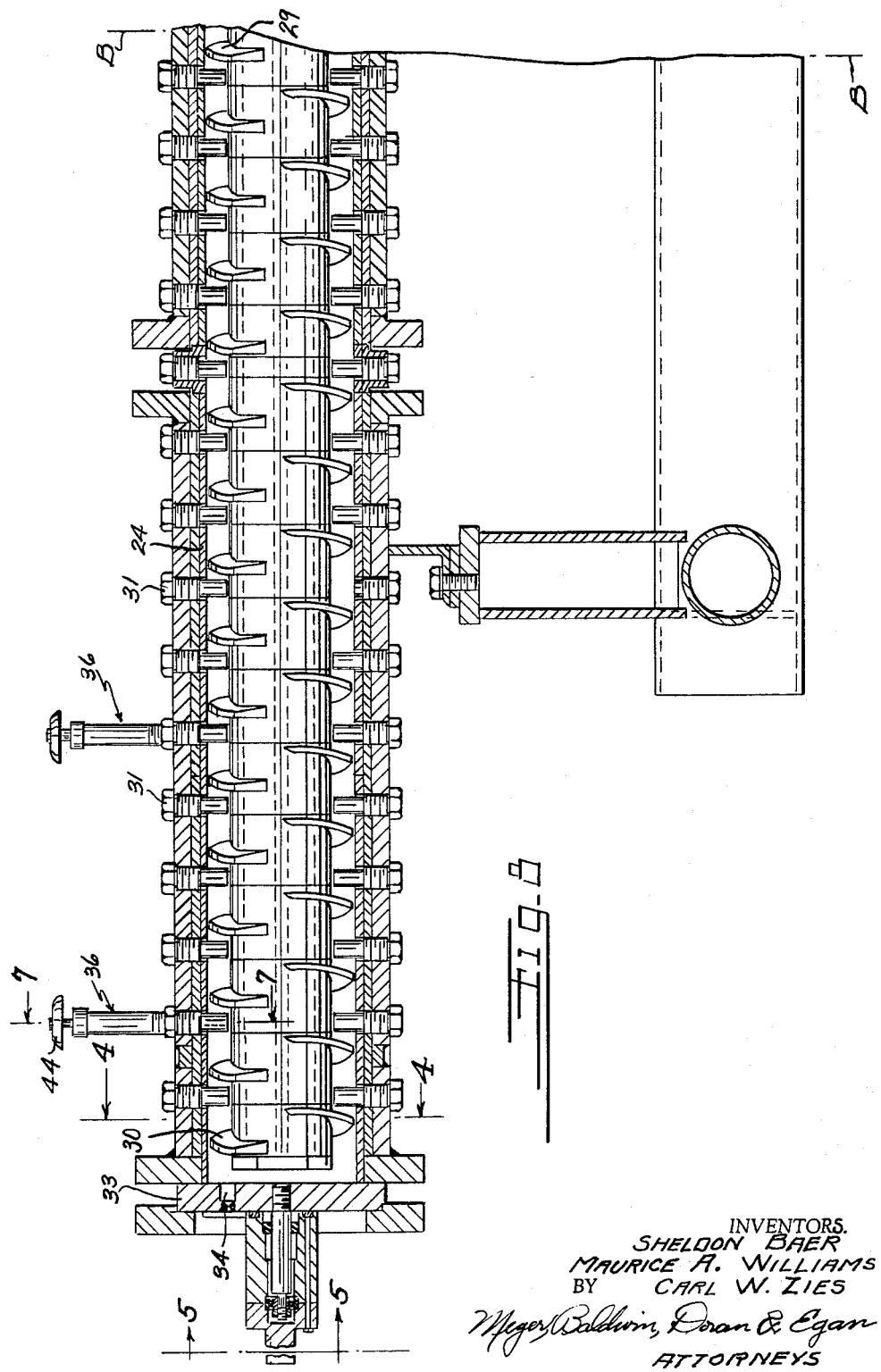

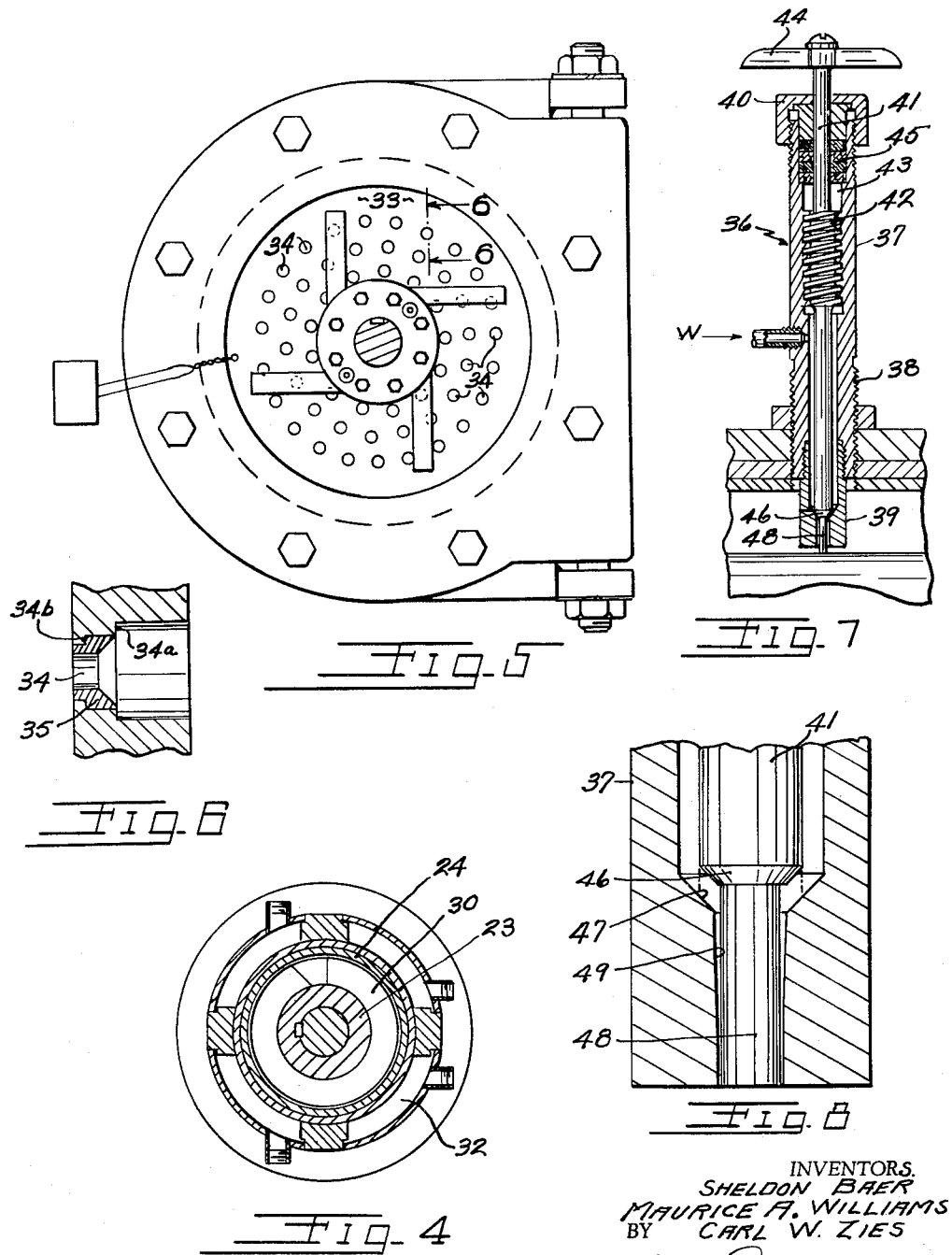

3,255,220
PRE-TREATMENT OF OLEAGINOUS PLANT MATERIALS
Sheldon Baer, Lyndhurst, Maurice A. Williams, Brookpark, and Carl W. Zies, Lakewood, Ohio, assignors to International Basic Economy Corporation, New York, N.Y., a corporation of New York
Filed Nov. 6, 1962, Ser. No. 235,628
12 Claims. (Cl. 260—412.2)

This invention relates to the pre-treatment of oleaginous materials prior to the extraction of oil therefrom. More particularly, it relates to the pre-treatment of oleaginous materials that have a finely divided particle size, and contain active lipolytic enzymes which may have the oil fraction thereof contained within the cellular structure of the material. Although rice bran, dry process corn germ, and rolled cottonseed meats are very effectively processed by the means and methods of this invention, and although rice bran will be used as a primary example, this invention is not limited to these specific commodities.

Rice bran is that portion of rice recovered by the polishing of brown rice after the removal of the siliceous hull of the material. The bran consists of the outer bran layer and the germ fraction. The yield of bran will range from 6.0% to 9.0% on the basis of the brown rice and will average about 8.5%. The oil content of the bran will range from 12.0% to 20.0% and will average about 15.0%. The current literature states that if modern extraction methods could be applied to the bran from the whole of the world crop, a quantity of vegetable oil amounting to more than three billion pounds could be obtained annually. Rice bran does not lend itself to the present art of extraction methods because of its very finely divided nature and because of its very active lipolytic enzyme. Approximately 75% of rice bran will pass a 24 mesh screen, and approximately 8% will pass a 100 mesh screen. As a consequence, when this bran is extracted by means of solvents in a total submergence extraction system, many of the fines float on the solvent and require expensive and cumbersome methods and means of removal. When the bran is extracted in percolation systems of solvent extraction, the finely divided material compacts into a relatively impervious bed so that solvent flow rates through the bed become limited and render the extraction process uneconomical.

By reason of the extreme activity of the enzymes in rice bran the lipolysis of the fat takes place at a rate of 1% per hour for the first few hours. As a consequence, much of the rice bran produced over the world is unsuitable for extraction purposes because the degree of free fatty acid rise renders the oil extracted therefrom unsuitable for use as a vegetable oil.

The following tabulation shows, in percentage figures, the increase in free fatty acid in rice bran samples under three different conditions, namely (1) as untreated, (2) as cooked and pelletized, and (3) as treated by means of the present invention. The table indicates that after several days standing the untreated bran becomes quite unsuitable for oil extraction purposes. The third and fourth columns of the table indicate that the two types of treatment there shown produce approximately equal results with respect to the presence of free fatty acid. The treatment according to the present invention has additional distinct advantages however, as will appear.

TABLE I.—FREE FATTY ACID RISE IN RICE BRAN SAMPLES

| Days of Storage | Free Fatty Acid, Percent in Oil of Sample | | |
|---|---|---|---|
| | Untreated Bran | Cooked Pelletized Bran | Bran Treated According to This Invention |
| 0 | 7.0 | 7.0 | 7.0 |
| 1 | 11.7 | 7.0 | 7.2 |
| 2 | 14.1 | 7.1 | 6.9 |
| 6 | 30.4 | 6.9 | 6.8 |
| 21 | 36.1 | 7.1 | 7.1 |
| 28 | 43.5 | 7.0 | 7.0 |
| 33 | 45.1 | 7.2 | 7.1 |
| 59 | 54.9 | 6.9 | 7.2 |
| 84 |  | 7.0 | 6.9 |

There are a few extraction plants that do directly extract the oil from the rice bran as it is polished from brown rice. These few plants, however, require a high investment cost per ton because of the slow extraction rate of the untreated bran and because of the presence of many fines, which requires auxiliary equipment for removal of the fines from the oil. A few other plants have moistened the bran and pelletized it by means of standard mills. Although this pelletizing obviates the necessity of auxiliary equipment for processing of fines in the solvent extraction plant, it does not render the lipolytic enzymes inactive. In addition the high density of the pellets causes a very slow extraction of the oil therefrom. Finally, the moist pellets from the pelletizing operation must be thermally dried prior to extraction. The compact nature of the pellets requires a relatively high number of B.t.u.'s for the removal of one pound of water from the material.

Table II, below, shows the percentage of residual oil remaining in the rice bran after each of the successive processing periods listed. It will be noted that in each of the three bran samples processed, the original oil content is the same. It will be noted, further, that after 5 minutes of treatment according to the present invention the residual oil has dropped to 1.95% whereas in the two conditions of prior art treatment the respective residual oil contents are 6.5% and 12.0%, indicating that by means of the present invention there is a very distinct economy of time.

TABLE II.—EXTRACTION RATE DATA SHOWING PERCENT OF RESIDUAL OIL AT STATED TIMES

| Time, Minutes | Residual Oil, Percent | | |
|---|---|---|---|
| | Untreated Bran | Pelletized Bran | Bran Treated According to This Invention |
| 0 | 17.8 | 17.8 | 17.8 |
| 5 | 6.50 | 12.0 | 1.95 |
| 10 | 2.95 | 8.2 | 1.17 |
| 20 | 1.80 | 5.1 | 0.81 |
| 30 | 1.22 | 3.7 | 0.63 |
| 45 | 0.94 | 2.7 | 0.50 |
| 60 | 0.65 | 1.9 | 0.42 |

One object of the present invention is to render the lipolytic enzymes of oleaginous materials inactive.

Another object of this invention is to compact finely divided oleaginous materials into a porous mass whose extractability is not decreased by compaction.

Another object of this invention is to rupture oil cells of oleaginous materials to increase extraction rates of such materials.

Another object of this invention is to transform finely divided oleaginous materials into agglomerated particles, extraction beds of which permit high flow rates of solvent through such beds.

A further object of this invention is to provide a means whereby oleaginous materials high in lipolytic enzymes may be stabilized and thereby stored, or transported and stored, for periods of weeks without deleterious lipolysis.

Other objects and advantages of the invention will be apparent from a study of the following specifications in conjunction with the accompanying drawings which illustrate one apparatus by which the invention may be achieved.

FIG. 2 is a view, mainly in longitudinal vertical section, and somewhat enlarged, showing the right end portion of the apparatus of FIG. 1.

FIG. 3 is a view similar to FIG. 2, but showing the left end portion of the apparatus. The line B—B on FIGS. 2 and 3 indicates the apparatus division plane of the two portions on which FIGS. 2 and 3 may be joined to show the complete unit.

FIGS. 4 and 5 are respective sectional views taken on lines 4—4 and 5—5 of FIG. 3.

FIG. 6 is a fragmentary sectional view taken on line 9—9 of FIG. 5 and somewhat enlarged.

FIG. 7 is a vertical sectional view taken on the line 7—7 of FIG. 3 and somewhat enlarged, the valve being closed.

FIG. 8 is a view of a fragmentary portion of the tip of the valve shown in FIG. 7, the valve being partially opened.

Figure 9:
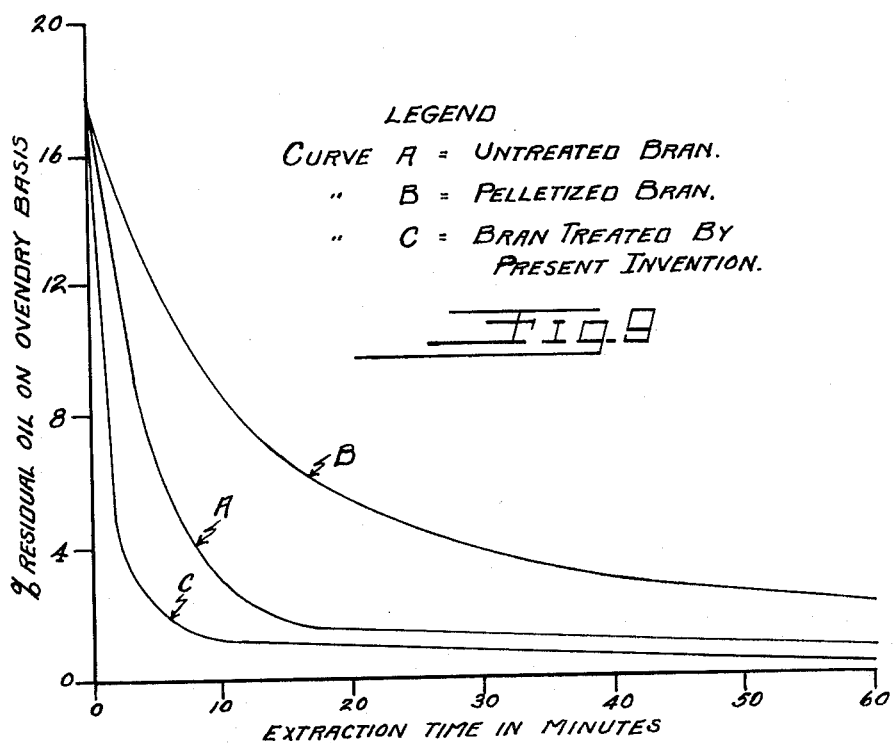

FIG. 9 is a graph illustrating pictorially the situation tabulated in Table II hereinabove.

Figure 1:
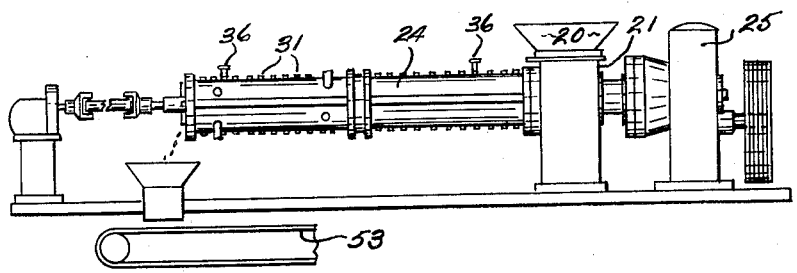
FIG. 1 is a view in side elevation of one apparatus that may be used in carrying out the methods of the present invention.

The apparatus of FIG. 1 includes a feed hopper 20 communicating with an entry aperture in housing 21. The oleaginous material is advanced by a feed worm 22 on shaft 23 into a barrel 24. The shaft is rotatable by motor means (not shown), through a gear reduction unit 25. Conventional bearings and packing are provided at the right end, or feed end, of the shaft. The shaft rotates axially within barrel 24 which is imperforate.

The shaft 23 (FIGS. 2 and 3) carries a succession of compression worms (26, 27, 28, 29, 30, etc.). Between each individual screw flight are inwardly extending breaker bolts 31, which are employed to prevent rotary motion of the oleaginous material within the blank section of the apparatus and to furnish a high degree of relative motion between the material within the breaker bolt area and that in the discharge area of each compression worm. The barrel shown in FIGS. 1, 2 and 3 is provided with steam jacket chambers 32 (FIG. 4). Although steam jacketing is normally not employed, as will be pointed out later, it may be necessary when processing certain commodities. At the left end of the barrel is a discharge mechanism to be more fully described herein below, but including a die plate 33 provided with discharge apertures 34 (FIGS. 3, 5, and 6). As best seen in section in the enlarged view, FIG. 6, the die plate 33 is bored to provide a reduced exit aperture having shoulders 34a and 34b which serve to retain a die insert 35. By this means dies of different aperture diameters, shapes and forms may be substituted.

Since it is preferable to increase the moisture content (when required) of the oleaginous material being processed by injection of water into the apparatus, and since it is preferable to furnish a high percentage of the B.t.u.'s required for heating of the oleaginous material by live steam injection, the valve 36 shown in FIGS. 7 and 8 are employed for such injection. The valve 36 comprises a housing 37 having a threaded portion 38 adapted to interfit one of the threaded apertures such as are occupied by breaker bolts 31 as shown in FIG. 2. Housing 37 also has a nonthreaded portion 39 which extends inwardly beyond the inner periphery of the barrel.

The housing 37 is hollow and is provided at the outwardly directed end thereof with a thread fitted cap 40. A valve stem 41 is mounted concentrically within the housing 37, said stem having an intermediate threaded portion 42 thread fitted within a bore 43 of said housing. The valve stem projects outwardly from the threaded portion 42 through a suitable aperture in the cap 40 and is provided at its outermost end with a handle 44. Packing 45 is compressed under the cap 40 whereby the stem 41 is sealed in relation to the bore 43.

The valve stem 41 is diametrically reduced at its inwardly directed portion and is provided at the end thereof with a frusto-conical valve closure member 46 which has a complementary interfit with the frusto-conical valve seat 47 (FIG. 8). A small, cylindrical plunger 48 extends coaxially inwardly from the valve closure member 46 and closely interfits a small, cylindrical bore 49 in the innermost end of the housing 37. The interfit between the small plunger 48 and the bore 49 is preferably such that when the valve closure 46 is unseated by turning the handle 44, pressurized steam may be admitted at W and forced past the piston 48 to enter into the barrel 24 but whereby the material being processed cannot easily enter the housing 37.

For injecting water, also at W, into an oleaginous material being processed in the apparatus just described, valve 36 is preferably employed in place of one of the breaker bolts in the feed end of the apparatus as shown in FIG. 2. When valve 36 is being employed for steam injection, such valve replaces a breaker bolt in the area of approximately ½ to ¾ along the length of the apparatus towards the discharge end, as shown in FIG. 3.

In operation, the oleaginous material to be processed is fed to feed hopper 20. Feed worm 22 conveys the solid material into barrel 24. The compaction worms 26, 27, etc. compress the material to an increasing degree along the length of the barrel. If the raw material is at a moisture content, for example of approximately 9.0%, water is injected by means of valve 36 inserted into, for example, the fourth breaker bolt opening from the feed end of the machine as shown in FIG. 2. Sufficient water is thus injected to raise the moisture content of the solid materials to 12.0% to 15.0%. As the solid material is conveyed along the barrel through the relatively narrow annular opening by the shaft 23 and barrel 24, a frictional heat is evolved as a result of the relative motion between shaft 23 and the solid material being processed. As a consequence the temperature of the solid material is increased by helical screw pressure during its course of travel through the apparatus. Live steam is then injected into the solid mass through one or more valves 36 located in breaker bolt openings past the center half of the barrel 24. Such steam is injected into the solid material so that the temperature of the material just ahead of the die plate 33 is preferably in the range of 220° F. to 250° F., but permissible in the range of 190° F. to 300° F. By addition of the live steam the moisture content of the solid material is further increased to a preferred range of 18% to 24%, but permissible in a range of 15% to 30%. Dry steam, if used, especially at temperatures in excess of 212° F., achieves a most efficient increase in B.t.u. content.

The design of the decreasing pitch worms 26, 27, etc. and the design and selection of die openings are such that the mechanical pressure imposed upon the solid material is higher than the steam pressure generated within the material. As a consequence the moisture content within the solid material is maintained in the liquid state. By maintaining this moisture in the liquid state a higher rate of heat transfer is realized between the shaft and the solid material. In addition the presence of this moisture in a liquid state prevents browning of the proteinaceous constituents of the oleaginous material.

The length of time for a commodity of the type herein above identified to be processed through an apparatus as shown herein may be in the range of 30 to 120 seconds. Although the specific length of time in process is not critical, it does characterize the fact that the objects of this invention may be carried out in a very short period of time, thus reducing any deleterious side effects as a result of relative high temperatures for sustained periods of time on the oleaginous material being processed. The solid material just ahead of die plate 33, therefore, might be at a moisture content of 18% and at a temperature of 230° F. under a mechanical pressure in the range of 100 to 1000 p.s.i., but preferably in a range of 200 to 500 p.s.i. Upon discharging from the apparatus through the apertures 34 in die plate 33, there is an instantaneous pressure drop so that some of the water in liquid form vaporizes, thus causing an expansion of the issuing solid material, which results in a porous structure of such material. Further, by converting water in the liquid state to a vapor state there is a decrease in moisture of the solid material with a simultaneous cooling of the material. Because of the porous nature of the solids they may continue to evaporate moisture readily down to a moisture content of 8% to 10%.

As one example of the methods of this invention, 109 pounds per hour of rice bran were fed to an apparatus as shown in FIG. 1. The rice bran contained 9% moisture. 0.022 gallons per minute of water was injected into the rice bran through a valve located in the fourth breaker bolt opening from the feed end of the machine. A 7/32" die opening was employed in the die plate. The temperature of the rice bran just ahead of the die plate was 242° F. Temperature of the bran after processing and collected on a conveyor, as conveyor 53, FIG. 1, was 168° F. The moisture content of the rice bran ahead of the die plate through water and steam injection was calculated to be 26.2%. The moisture content of the processed bran collected on conveyor 53 as in FIG. 1 was 18.8%.

The screen analysis of this material is shown in Table III, herewith.

TABLE III.—U.S. TYLER SIEVE ANALYSIS OF RICE BRAN SAMPLES

| U.S. Series Sieve No. | Bran on Sieve, Percent | |
|---|---|---|
| | Untreated Bran | Bran Treated According to This Invention |
| 4 | | 28.2 |
| 5 | | 5.7 |
| 6 | | 7.6 |
| 8 | | 13.1 |
| 10 | | 10.4 |
| 14 | 0.8 | |
| 24 | 23.5 | 22.3 |
| 40 | 41.0 | 8.5 |
| 60 | 13.7 | 2.8 |
| 100 | 13.2 | 1.4 |
| 200 | 6.2 | |
| Passed | 1.1 | |

It will be observed that whereas 75.2% of the original rice bran passed a 24 mesh screen, as shown by the last five figures in the middle column, only 12.7% of the process material passed a 24 mesh screen as shown by the bottom three figures in the last column. The bulk density of the treated bran was 23 pounds per cubic foot. The bed penetration rate was 98.4 mm. per minute. The percolation rate of solvent through a bed of treated solids was 35 gallons per minute per square foot. The drainage time to accomplish free drainage of solvent from extracted solids was 1.6 minutes. These values compare very favorably with readily extractable materials, for example, like soybean flakes, which are well known to the art. On the other hand, the bed penetration rate for untreated rice bran was approximately 98.4 mm. per hour, as compared with 98.4 mm. per minute, above, which means that approximately one hour's time was required for extraction solvent to penetrate or to flow to the bottom of a 98.4 mm. column of the solid material. The percolation of solvent through a bed of the untreated bran under the test conditions of the percolation rate was zero gallons per minute per square foot. Although these two values should not be extrapolated directly to commercial operation, they do give relative indications of the greatly increased permeability of a bed of rice bran treated by the methods of this invention as compared with the untreated bran.

A sample of this treated rice bran was placed in an open container and allowed to sit for 84 days, during which time samples were withdrawn for oil extraction and free fatty acid determination. These data are given in Table I. Along with this "shelf life test," a sample of untreated rice ban was similarly analyzed. To further demonstrate the advantages of this invention, another sample or rice bran was cooked under conditions common in the art, and as practiced particularly in the processing of cottonseed meats. This sample was then pelletized in a standard pellet machine as is well known in the art. A sample of this material was similarly analyzed over an 84 day period of time as recorded in Table I.

The data in Table I demonstrates that the untreated rice bran underwent a very rapid rise in free fatty acid. On the other hand, the bran cooked under standard commercial conditions and the bran treated according to the methods of this invention did not show any determinate increase in free fatty acid. Each of the three sample tested were adjusted to a 10.0 moisture basis.

Standard procedures well known to the art were then employed to determine the rate of extraction of oil from the untreated bran, the cooked and pelletized bran, and the bran processed according to the methods of this invention. These data are given above in Table II and plotted in FIG. 9. From these data it will be observed that the bran treated according to the methods of this invention exhibits a very rapid oil extraction rate, particularly when compared to the cooked and pelletized material. This rate of extraction is similar to rates obtained for standard soybean flakes.

By the methods of this invention, therefore, methods and means are provided wherein a commodity like rice bran may be processed within several seconds of time to yield a product that does not undergo lipolysis for a period of a month and a half of storage. The treated material is in a relatively coarse particle form that readily lends itself to solvent extraction by any of the standard means known to the art, and finally the porous structure of the solid material along with the fact that oil cells have been ruptured in the original germ permits a rate of extraction far superior to a pelletized material and equivalent to commodities which in the art lend themselves economically to the extraction process.

The methods of this invention, therefore, make it possible to transform raw materials like rice bran, dry process corn germ, rolled cottonseed meats, etc., into stabilized materials with respect to enzyme systems and into materials that are readily extractable in standard commercial units. In addition the methods of this invention make it possible for small rice processors to transform their relatively small quantities of bran into a fat-stable form which then can be transported to central plants for oil extraction.

What is claimed is:

1. A method of pre-treating oil bearing plant material containing active enzymes to restrain the rate of enzyme activity, said method comprising advancing the material through an elongated enclosure from a charging end to a discharging end, progressively producing an increase in the temperature of the material as it advances, so as to achieve a temperature in excess of the boiling point of water as the material approaches the discharging end, maintaining sufficient mechanical pressure on the material to prevent vaporization of any water content by causing said mechanical pressure in each zone to exceed the vaporization pressure arising from the temperature in said zone, and then discharging the material from said discharge end into a zone of reduced pressure.

2. A method as defined in claim 1 in which the material is rice bran.

3. A method as defined in claim 1 including the step of increasing the moisture content of the material to between fifteen and thirty percent as it advances through the enclosure.

4. A method as defined in claim 3 including the step of injecting water through the enclosure wall.

5. A method as defined in claim 3 including the step of injecting steam through the enclosure wall.

6. A method as defined in claim 1 in which the material is dry process corn germ.

7. A method as defined in claim 1 in which the material is rolled cottonseed meats.

8. A method of pre-treating oil bearing rice bran containing active lipolytic enzymes to prepare the material for oil extraction while restraining the rate of lipolysis of fat and consequent rise in free fatty acid, said method comprising advancing the bran through an elongated enclosure, applying increasing mechanical pressure to the bran while progressively increasing its temperature so as to maintain sufficient mechanical pressure to exceed the vapor pressure arising from the temperature of the bran, injecting steam into the bran whereby to raise the temperature of the bran still further to a range between 190° F. and 300° F. and to increase the moisture content of the bran between fifteen and thirty percent, and then discharging the bran into a zone of reduced pressure.

9. A method as defined in claim 8 wherein the material is advanced completely through the enclosure in less than two minutes.

10. A method of pre-treating oil bearing dry process corn germ material containing active lipolytic enzymes to prepare the material for oil extraction while restraining the rate of lipolysis of fat and consequent rise in free fatty acid, said method comprising advancing the material through an elongated enclosure from a charging end to a discharging end, progressively producing an increase in the temperature of the material by helical screw pressure thereon as the material advances so as to maintain sufficient mechanical pressure to exceed the vapor pressure, arising from the temperature of the material, as the material approaches the discharge end, increasing the moisture content of the material to between fifteen and thirty percent as it is advanced through the enclosure, and then discharging the material into a zone of reduced pressure.

11. A method of pre-treating oil bearing rolled cottonseed meats containing active lipolytic enzymes to prepare the material for oil extraction while restraining the rate of lipolysis of fat and consequent rise in free fatty acid, said method comprising advancing the material through an elongated enclosure from a charging end to a discharging end, progressively producing an increase in the temperature of the material by helical screw pressure thereon as the material advances so as to maintain sufficient mechanical pressure to exceed the vapor pressure, arising from the temperature of the material, as the material approaches the discharge end, increasing the moisture content of the material to between fifteen and thirty percent as it is advanced through the enclosure, and then discharging the material into a zone of reduced pressure.

12. A method of pre-treating oil bearing plant material containing active enzymes to prepare the material for oil extraction while restraining the rate of enzyme activity, said method comprising advancing the material through an elongated enclosure, applying increasing mechanical pressure to the material while progressively increasing its temperature so as to maintain sufficient mechanical pressure to exceed the vapor pressure arising from the temperature of the material, as the material approaches the discharge end of said enclosure, injecting steam into the material whereby to raise the temperature of the material still further to a range between 190° F. and 300° F. and to increase the moisture content of the material to between fifteen and thirty per cent, and then discharging the material into a zone of reduced pressure.

References Cited by the Examiner

UNITED STATES PATENTS

| | | | |
|---|---|---|---|
| 1,164,383 | 12/1915 | MacNeale | 260—412.2 |
| 2,585,978 | 2/1952 | Van Alla et al. | 260—412.2 X |
| 2,629,722 | 2/1953 | Dunning | 260—412.2 X |

FOREIGN PATENTS 15,961    2/1912    Great Britain.

CHARLES B. PARKER, *Primary Examiner.*

ANTON H. SUTTO, *Assistant Examiner.*